(12) United States Patent
Winarski et al.

(10) Patent No.: US 6,879,454 B2
(45) Date of Patent: Apr. 12, 2005

(54) WRITE-ONCE READ-MANY HARD DISK DRIVE

(75) Inventors: Daniel James Winarski, Tucson, AZ (US); Kamal Emile Dimitri, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 10/617,606

(22) Filed: Jul. 11, 2003

(65) Prior Publication Data

US 2005/0007685 A1 Jan. 13, 2005

(51) Int. Cl.[7] .............................................. G11B 19/04
(52) U.S. Cl. ................................................ 360/60; 360/63
(58) Field of Search ............................... 360/60–63, 68, 360/46, 67; 711/163, 111, 112

(56) References Cited

U.S. PATENT DOCUMENTS 5,402,406 A    3/1995   Fuma et al.
5,435,562 A    7/1995   Stock
6,272,533 B1   8/2001   Browne
6,330,648 B1   12/2001  Wambach et al.
2002/0129273 A1 9/2002  Noonan

FOREIGN PATENT DOCUMENTS

JP   6150535 A     5/1994
JP   2000293438 A  10/2000

*Primary Examiner*—Alan T. Faber
(74) *Attorney, Agent, or Firm*—Dale M. Crockatt; Dillon & Yudell LLP

(57) ABSTRACT

A modified disk drive that includes means for selectively and permanently disabling the write mode of the hard disk drive by the use of programmable read only memory (PROM) circuitry is provided. One method of use employs selectively blowing a PROM fuse in the arm electronics of the hard disk drive to prevent further writing to a respective disk surface in the hard disk drive. A second method of use employs selectively blowing a PROM fuse in processor-accessible memory, to prevent further writing to a section of logical block addresses (LBAs) corresponding to a respective set of data sectors in the hard disk drive.

20 Claims, 9 Drawing Sheets

| Zone | Sectors per Revolution per Surface | Revolutions per Minute | Megabytes (MB) per Second Under Head |
|---|---|---|---|
| 0 (Outer) | 315 | 5400 | 14.51 |
| 1 | 306 | 5400 | 14.10 |
| 2 | 300 | 5400 | 13.82 |
| 3 | 288 | 5400 | 13.27 |
| 4 | 282 | 5400 | 12.99 |
| 5 | 270 | 5400 | 12.44 |
| 6 | 258 | 5400 | 11.89 |
| 7 | 247 | 5400 | 11.38 |
| 8 | 240 | 5400 | 11.06 |
| 9 | 234 | 5400 | 10.78 |
| 10 | 225 | 5400 | 10.37 |
| 11 | 216 | 5400 | 9.95 |
| 12 | 210 | 5400 | 9.67 |
| 13 | 198 | 5400 | 9.12 |
| 14 | 192 | 5400 | 8.84 |
| 15 (inner) | 180 | 5400 | 8.29 |

Fig. 6

| Zone | Sectors per Revolution per Surface | Tracks per Zone | Sectors per Zone | Percentage Total Capacity |
|---|---|---|---|---|
| 0 (Outer) | 315 | 373 | 117,495 | 6% (5.5%) |
| 1 | 306 | 430 | 131,580 | 6% (6.1%) |
| 2 | 300 | 492 | 147,600 | 7% (6.9%) |
| 3 | 288 | 881 | 253,728 | 12% (11.8%) |
| 4 | 282 | 478 | 134,796 | 6% (6.3%) |
| 5 | 270 | 1212 | 327,240 | 15% (15.2%) |
| 6 | 258 | 405 | 104,490 | 5% (4.9%) |
| 7 | 247 | 608 | 150,176 | 7.0% (7.0%) |
| 8 | 240 | 411 | 98,640 | 5% (4.6%) |
| 9 | 234 | 419 | 98,046 | 5% (4.6%) |
| 10 | 225 | 366 | 82,350 | 4% (3.8%) |
| 11 | 216 | 421 | 90,936 | 4% (4.2%) |
| 12 | 210 | 358 | 75,180 | 4% (3.5%) |
| 13 | 198 | 603 | 119,394 | 6% (5.5%) |
| 14 | 192 | 357 | 68,544 | 3% (3.2%) |
| 15 (inner) | 180 | 585 | 105,300 | 5% (4.9%) |

*Fig. 7*

WRITE-ONCE READ-MANY HARD DISK DRIVE

TECHNICAL FIELD

This invention relates to data recording information storage systems and methods related thereto. In particular, the invention relates to data recording disk drives and host computers having means for selectively and permanently disabling overwrite modes of the disk drives when the data written to these disk drives needs to be write-once, read-many (WORM).

BACKGROUND

Information storage devices, which include magnetic storage devices and optical data storage systems, utilize at least one rotatable disk with concentric data tracks containing the information, a transducer for reading data from or writing data to the various tracks, and a head positioning actuator connected to a head for moving it the desired track and maintaining it over the track during read or write operations. The input/output (I/O) transducer is attached to a suspension, and that suspension is attached to an actuator arm of the head positioning actuator. There are typically a plurality of disks separated by spacer rings, the spacer rings allowing heads to access the disks. The disks are stacked on a hub that is rotated by a spindle motor. A housing supports the spindle motor and head actuator and also surrounds the head and disk(s) to provide a substantially environmentally sealed container for the head-disk interface.

Generally a data processing system operates with a host processor including a main memory, typically comprising solid state memory, and a secondary memory comprising one or more storage devices such as a magnetic disk or optical disk storage device. Magnetic disk storage devices typically have a read/write capability, allowing the magnetic disk to be written and read many times. Most optical data storage systems utilize optical media, including disks recorded using rewritable and Write-Once Read-Many (WORM) techniques. Optical disks recorded according to WORM techniques are often used for archival purposes because they can be written only once by a laser. These WORM techniques include irreversible surface ablation and irreversibly combining two or more thin metal films into an alloy of different reflectivity. These optical WORM techniques do not exist for magnetic disk storage devices.

There are some applications in which it is necessary or highly advantageous to provide a permanent, non-alterable version of a file. For example, legal documents, such as Securities and Exchange Commission (SEC) records, stock trading records, business dealings, e-mail, insurance records, etc. should be permanently stored on a media that cannot be altered once the files have been written to the storage device. Similar requirements for permanence exist for medical records and images. Traditionally, WORM functionality has been provided by ablative or alloy optical media used in optical disk drives.

Given the ease with which data can be altered on conventional magnetic storage media, a number of applications use optical disks for providing such "permanent" or "non-alterable" storage. However, there is a need to provide such WORM functionality in a magnetic storage device, such as a hard disk drive (HDD) or a direct access storage device (DASD). One method of providing such functionality is to permit a manual change to the HDD such as setting an external switch or a jumper (pin or wire) to a write-inhibit position to prevent the magnetic storage media from being overwritten. This method suffers from the drawback that the mechanism is easily reversed to make the media writable once again, because the switch or jumper could be temporarily reset to permit alteration of the data, and then reset back to the write-inhibit position. Such a solution is unsatisfactory for the typical WORM applications, which require the integrity of the saved data be maintained. Therefore, a need exists for secure WORM functionality in a magnetic hard disk drive.

SUMMARY OF THE INVENTION

In accordance with the present invention, a rotating disk drive data storage device comprises a disk drive base, at least one rotatably mounted disk for recording data on at least one surface of said at least one rotatably mounted disk, a movable actuator supporting at least one transducer head, said actuator positioning said at least one transducer head to access data on said at least one surface of said at least one rotatably mounted disk, and circuitry for controlling the operation of said disk drive data storage device, said circuitry producing at least one write signal that instructs said at least one transducer head to write data to at least one portion of at least one surface of at least one rotatably mounted disk of said at least one rotatably mounted disk, said circuitry further including one or more fuzes electrically coupling said at least one transducer head to said at least one write signal, wherein blowing said one or more fuzes prevents said at least one write signal from being received at said transducer head, thereby preventing said rotating magnetic disk drive data storage device from overwriting said data written to said at least one portion.

In an alternative embodiment of the rotating disk drive data storage device, said at least one portion is an entire recording surface of said at least one rotatably mounted disk. In another alternative embodiment of the rotating disk drive data storage device, said at least one portion is a sector of a recording surface of said at least one rotatably mounted disk. In respective alternative embodiments, said one or more fuzes electrically couple circuitry for generating said at least one write signal to said transducer head; said one or more fuzes electrically enable circuitry for generating at least one write signal associated with a specified logical address, wherein said at least one portion is associated with said specified logical address such that said at least one write signal associated with said specified logical address is required at said at least one transducer head to enable said at least one transducer head to write data to said at least one portion; said circuitry produces said at least one write signal responsive to an external command received by said rotating disk drive storage device; said rotating disk drive data storage device is one of a plurality of rotating disk drive data storage devices; and said rotating disk drive data storage device is a magnetic rotating disk drive data storage device.

For a fuller understanding of the nature and advantages of the present invention, reference should be made to the following detailed description taken together with the accompanying drawings.

BRIEF DESCRIPTION OF THE DRAWINGS

FIG. 6 shows the sectors per revolution per surface, and how the data rate varies for ZCAV.

FIG. 7 shows an example of the number of sectors per zone for ZCAV format.

DETAILED DESCRIPTION OF PREFERRED EMBODIMENTS

Figure 1:
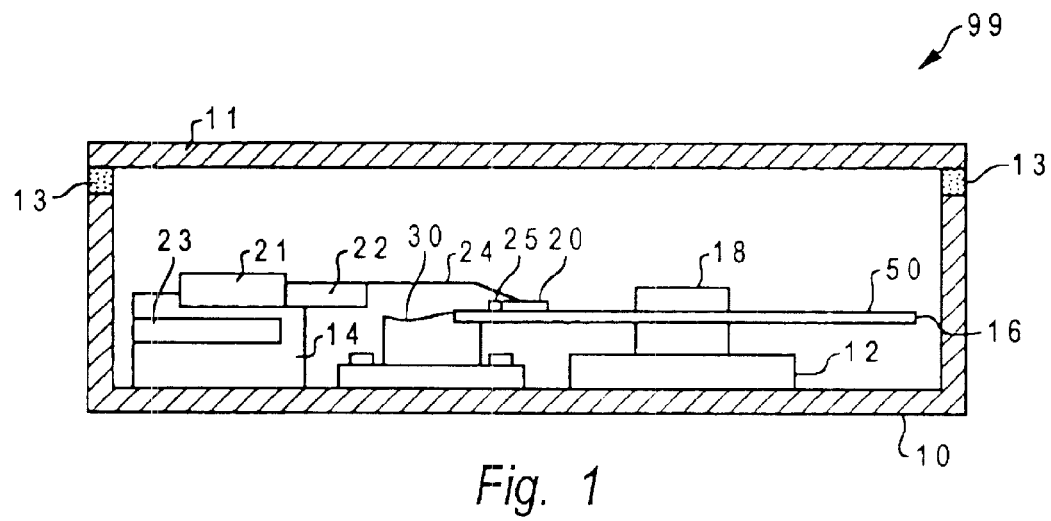
FIG. 1 shows a side view of a hard disk drive.
Figure 2:
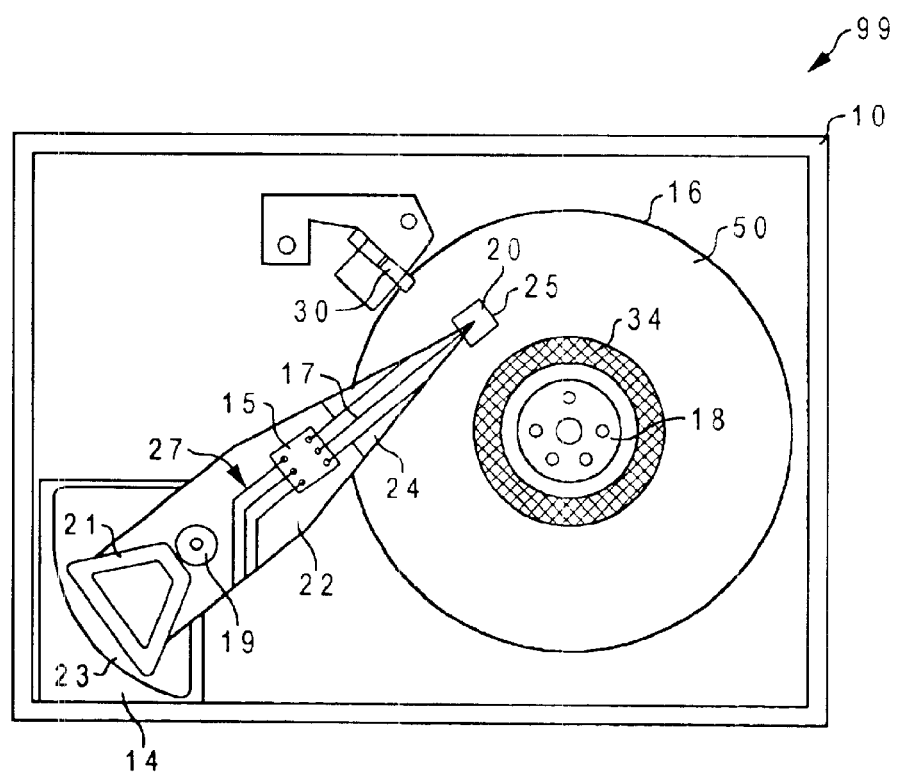
FIG. 2 shows a top view of a hard disk drive.

Referring first to FIG. 1, there is illustrated in sectional view a schematic of a disk drive 99 according to the present invention. For ease of illustration and explanation, the disk drive 99 depicted in FIGS. 1 and 2 is shown as having a single recording head and associated disk surface, although conventional disk drives typically have multiple heads, one on each side of multiple disks and the present invention applies equally to both multiple disk/head and single disk/head drives.

The disk drive 99 comprises a base 10 to which are secured a spindle motor 12, an actuator 14 and a cover 11. The base 10 and cover 11 provide a substantially sealed housing for disk drive 99. Typically, there is a gasket 13 located between base 10 and cover 11. A small breather port (not shown) for equalizing the air pressure between the interior of disk drive 99 and the outside environment is typically placed in a base 10 of larger HDDs. Smaller HDDs, such as the HDDs used in laptops and notebooks, may not need this small breather port due to the tiny amount of free cavity volume in smaller HDDs. This type of disk drive is described as being substantially sealed because the spindle motor 12 is located entirely within the housing and there is no external forced air supply for cooling the interior components. A magnetic recording disk 16 is connected to spindle motor 12 by means of spindle or hub 18 for rotation by spindle motor 12. A thin film 50 of lubricant is maintained on the surface of disk 16.

A read/write head or transducer 25 is formed on the trailing end of an air-bearing slider 20. Transducer 25 typically has an inductive write transducer and either a magnetoresistive (MR) or a giant magnetoresistive (GMR) read transducer, all of which are formed by thin-film deposition techniques as is known in the art. The slider 20 is connected to the actuator 14 by means of a rigid arm 22 and a flexible suspension 24, the flexible suspension 24 providing a biasing force which urges the slider 20 towards the surface of the recording disk 16. The arm 22, flexible suspension 24, and slider 20 with transducer 25 are referred to as the head-slider-arm (HSA) assembly.

During operation of disk drive 99, the spindle motor 12 typically rotates the disk 16 at a constant angular velocity (CAV), and the arm 22 pivots about shaft 19 to move slider 20 in a gentle arc that is aligned generally radially across the surface of disk 16, so that the read/write transducer 25 may access different data tracks on disk 16. The actuator 14 is typically a rotary voice coil motor (VCM) having a coil 21 that moves in an arc through the fixed magnetic field of magnetic assembly 23 when current is applied to coil 21. Alternately, arm 22, flexible suspension 24, slider 20, and transducer 25 could move along a radial line via a linear VCM (not shown).

FIG. 2 is a top view of the interior of disk drive 99 with the cover 11 removed, and illustrates in better detail flexible suspension 24 which provides a force to the slider 20 to urge it toward the disk 16. The suspension may be a conventional type of suspension such as the well-known Watrous suspension, as described in U.S. Pat. No. 4,167,765. This type of suspension also provides a gimbaled attachment of the slider 20 that allows the slider 20 to pitch and roll as it rides on the air bearing. The data detected from disk 16 by transducer 25 is processed into a data readback signal by an integrated circuit signal amplification and processing circuit in arm electronics (AE) 15, located on arm 22. The signals between transducer 25 and arm electronics 15 travel via flex cable 17. The signals between arm electronics 15 and I/O channel 112 of FIG. 3 travel via cable 27. Arm 22 rotates about pivot 19.

In the load/unload embodiment of disk drive 99, a load/unload ramp 30 (FIG. 2) is mounted to the base 10. Ramp 30 contacts suspension 24 and lifts the slider 20 away from disk 16 when the actuator 14 rotates the slider 20 toward the disk outside diameter when disk drive 99 is powered down. Such powering down can include a power-saving sleep mode when disk drive 99 has been inactive for a predetermined period of time. If disk drive 99 does not utilize a load/unload ramp 30, disk 16 typically has a dedicated textured landing zone 34 near the inside diameter of disk 16, away from the data region. Disk drive 99 moves slider 20 to textured landing zone 34 when disk drive 99 is powered down. Disk drive 99 may have both a load/unload ramp 30 and a textured landing zone 34.

In general, the preferred parking location for the actuator 14 when disk drive 99 is stopped will be its usual storage location, i.e., either with the slider 20 unloaded off the disk 16 onto load/unload ramp 30 (for a load/unload drive) or with the slider 20 in contact with the textured surface of disk 16 at landing zone 34 (for a non-load/unload drive). At these locations, the slider 20 is not in contact with the smooth data region of the disk and a powered-off disk drive can be started using normal startup procedures of high current supplied to spindle motor 12 until disk 16 accelerates to its operating RPM.

Figure 3:
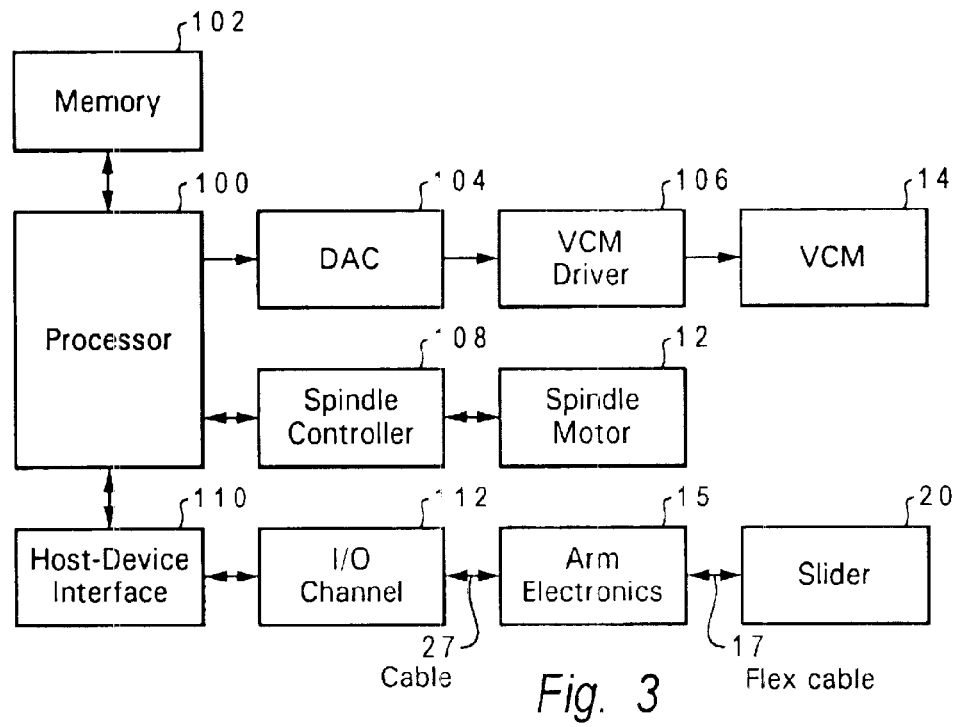
FIG. 3 shows the control circuitry of a hard disk drive.

Referring now to FIG. 3, drive electrical components include a processor 100 that processes instructions contained in memory 102. Processor 100 may comprise an off-the-shelf processor, custom processor, FPGA (Field Programmable Gate Array), ASIC (Application Specific Integrated Circuit), discrete logic, etc. Memory 102 may comprise random access memory (RAM) and/or nonvolatile memory and is typically used to hold variable data, stack data, executable instructions, etc. The nonvolatile memory may comprise any type of nonvolatile memory such as EEPROM (Electrically Erasable Programmable Read Only Memory), PROM (Programmable Read Only Memory), battery backup RAM, hard disk drive, etc. Processor 100 sends digital signals to digital-to-analog converter (DAC) 104, for conversion to low-power analog signals. These low-power analog signals are received by VCM driver 106. VCM driver 106 amplifies the low-power analog signals into high-power signals to drive VCM 14. Processor 100 also controls and is connected to the spindle motor 12 via spindle controller 108. VCM 14 is energized by the VCM driver 106 which receives analog voltage signals from DAC 104. VCM driver 106 delivers current to the coil of VCM 14 in one direction to pivot the head-slider-arm assembly radially outward and in the opposite direction to pivot the head-slider-arm assembly radially inward. The spindle controller 108 controls the current to the armatures of spindle motor 12 to rotate the motor at a constant rotational speed, which is also known as constant angular velocity, or CAV, during drive operation. In addition, the spindle controller 108 provides a status signal to processor 100 indicating whether or not spindle motor 12 is rotating at its operating speed via the back electromotive force (BEMF) voltage from spindle motor 12, which will have a nonzero value when motor 12 is rotating. Spindle motor 12 is commonly a brushless DC motor with three windings or three sets of windings. Spindle motor 12 typically has ball bearings for low rotational speed drives (less than 10000 RPM (revolutions per minute)). For high speed disk drives (10000 to 15000 RPM), fluid bearings may be used.

Host-device interface 110 communicates with processor 100. Additionally, host-device interface 110 receives data from host computer 120 (FIG. 4) and sends it to I/O channel 112, where the data is encoded before being sent via cable 27 to arm electronics 15. Typical encoding is via a convolution encoder. From arm electronics 15, the encoded data is sent via flex cable 17 to the inductive write transducer on slider 20 resulting in the encoded data being written to disk 16. Similarly, when data is requested by host computer 120, the MR or GMR read transducer on slider 20 reads the encoded data off of disk 16, and sends that data to arm electronics 15 via flex cable 17. From arm electronics 15, the encoded data is sent via cable 27 to be decoded by I/O channel 112 before being sent to host computer 120 via host-device interface 110. A typical decoder is a PRML (partial-response, maximum likelihood) decoder.

Figure 4:
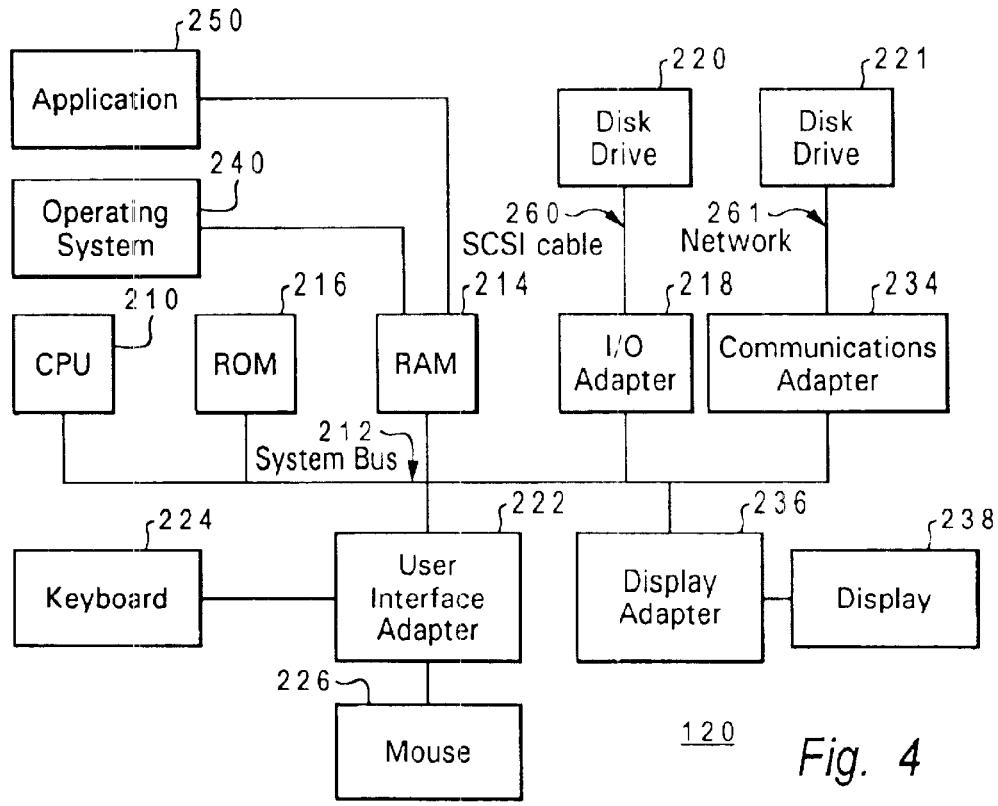
FIG. 4 shows a computer system utilizing a hard disk drive.

FIG. 4 illustrates a typical hardware configuration of a host computer 120 utilizing the hard disk drive shown in FIGS. 1 and 2. Host computer 120 has a central processing unit (CPU) 210 coupled to various other components by system bus 212. An operating system 240, runs on CPU 210 and provides control of host computer 120 and the attached hard disk drives 220 and 221, either of which may incorporate disk drive 99. Keyboard 224 and mouse 226 are connected to system bus 212 via user interface adapter 222.

Read only memory (ROM) 216 is coupled to system bus 212 and includes a basic input/output system (BIOS) that controls certain functions of computer 120. Random access memory (RAM) 214, I/O adapter 218, and communications adapter 234 are also coupled to system bus 212. It should be noted that software components including operating system 240 and application 250 are loaded into RAM 214, which is the main memory of computer 120. I/O adapter 218 may be a small computer system interface (SCSI) adapter. SCSI cable 260 is connected between I/O Adapter 218 and Host-Device Interface 110 of FIG. 3 so that host computer 120 communicates with disk drive 220. Similarly, communications adapter 234 communicates with Network Attached Storage (NAS) disk drive 221 via network 261. Communications adapter 234 may be an Ethernet, Fiber Channel, ESCON, FICON, Wide Area Network (WAN), or TCP/IP interface. A display monitor 238 is connected to system bus 212 by display adapter 236. In this manner, a user is capable of receiving visual messages concerning the disablement of the write-mode.

Figure 5:
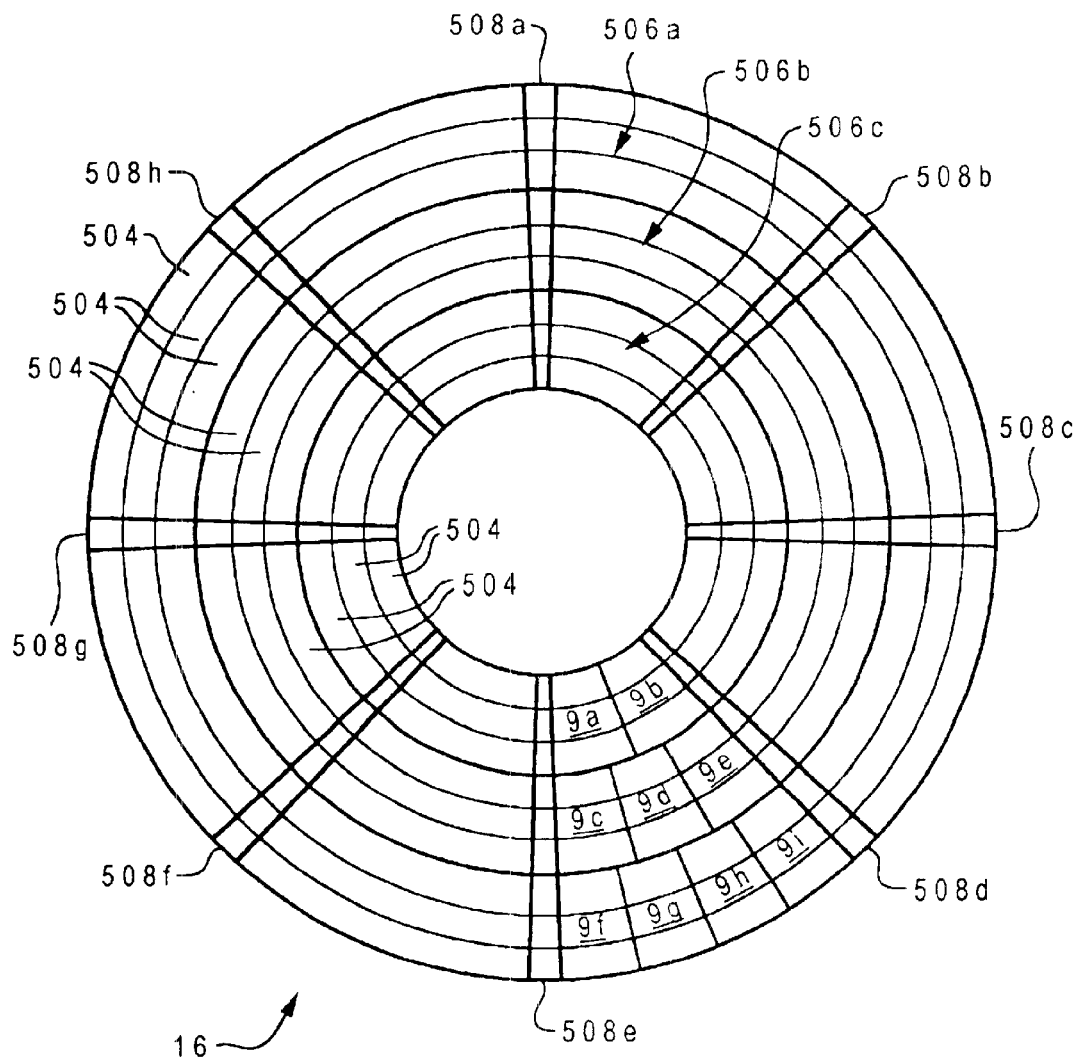
FIG. 5 shows the ZCAV format of one surface of a hard disk.

FIG. 5 illustrates an arrangement of a recording surface of a disk 16 divided into concentric circular "tracks" on the disk surface. Disk 16 rotates at a constant angular velocity (CAV). It is divided up into zones 506a, 506b, and 506c, so the overall format of disk 16 is ZCAV, or zoned constant angular velocity. Each zone is divided into data sectors laid out on concentric tracks 504. Alternately, spiral tracks may be used. In a given angular region, outer zone 506a has data sectors 9f, 9g, 9h, and 9i; middle zone 506b has data sectors 9c, 9d, and 9e; and inner zone 506c has data sectors 9a and 9b. A logical block address (LBA) is used to address a specific data sector 9a–9i. A data sector is the smallest logical unit that can be accessed on the disk. The size of a data sector is typically 512 bytes. As can be seen in FIG. 5, there are more data sectors per track in the outer zones than in the inner zones. This is better shown in FIGS. 6 and 7. Processor 100 of FIG. 3 maps the LBA locations for disk drive 99 from information in FIGS. 6 and 7, and this information is stored in memory 102.

Prerecorded servo sectors 508a–508h are also shown. These servo sectors 508a–508h are contiguous from the inner to the outer data radius of the disk. These servo sectors are radial if the head moves linearly across the disk. These servo sectors will gently arc if the arm 22 rotates about a pivot 19, as shown in FIG. 2. These servo sectors may actually cut across data sectors 9a–9i, which is called split-sectoring, although that is not shown in FIG. 5. These servo sectors may include servo identification (SID) information and a quadrature ABCD burst. The quadrature ABCD bursts in each servo sector are read by the magnetic head and used to keep the head over the proper data track 504.

A read or a write command, such as a SCSI command, includes a starting LBA address of the command and a transaction length. The processor 100 maps the LBA to a specific data position on one of the disk surfaces, which is called a physical sector. In this embodiment, the LBA's are preferably mapped sequentially on a surface from the outer to the inner recording radius, or from the inner to the outer recording radius. Once the entire surface is mapped, then the mapping jumps to the next surface, until each surface is completely mapped on all disks in disk drive 99.

FIG. 6 comprises a table showing the data transfer rates per second for sixteen different zones, numbered from zero for the outermost zone to the highest number zone 15, which is the innermost zone. The second column shows that the outermost zones have a higher number of sectors per disk revolution than the inner zones, as the tracks in the outermost zones have a greater circumference, thereby allowing more sectors than the inner zones. In the example of FIG. 6, the disk rotates at a constant 5400 revolutions per minute (RPM). Assuming each sector comprises 512 bytes, the megabytes per second (fourth column) for a zone comprises the sectors per zone (second column) times the bytes per sector (512) times the revolutions per minute (third column) and divided by 60 seconds per minute. Thus, the outer zones have a higher data transfer rate in megabytes per second (MB/s) than the inner zones due to the greater number of sectors per track in the outer zones. This megabytes per second information is used by processor 100 to operate I/O channel 112 at the correct data rate for the zone where I/O is occurring.

FIG. 7 illustrates a table showing the number of sectors per zone, per disk recording surface. The second column is the same as the second column of FIG. 6, the sectors per revolution, per surface. The third column shows the number of tracks in a zone. Multiplying the second and third columns provides the sectors per zone as shown in the fourth column. The number of sectors of an inner zone may exceed the sectors in an outer zone, if the inner zone includes more tracks than the outer zone. The fifth column shows the total capacity of each zone as a percentage of total disk capacity. The value in the parenthesis shows the exact percentage, rounded in the value to the left of the parenthesis.

Processor 100 uses the information in FIG. 7, which is stored in memory 102 to locate a specific LBA. Starting at outer zone 0, the processor 100 knows how many sectors per revolution (or sectors per track) and the number of tracks in that zone. Thus, if the LBA is located within outer zone 0, it is easy to simply divide the LBA number by the sectors per revolution, in this case 315, to get how many tracks to traverse or seek across, and the remainder minus one gives the number of sectors to skip over in that destination track in order to reach the desired LBA. If the LBA is not located in outer zone 0, then the capacity of the zones which the LBA is not in, must be subtracted from the LBA number before dividing by the number of tracks per revolution of the destination zone, to get the destination track, and the remainder minus 1 to get the number of sectors to skip over to get to the desired sector in the destination track.

Figure 8:
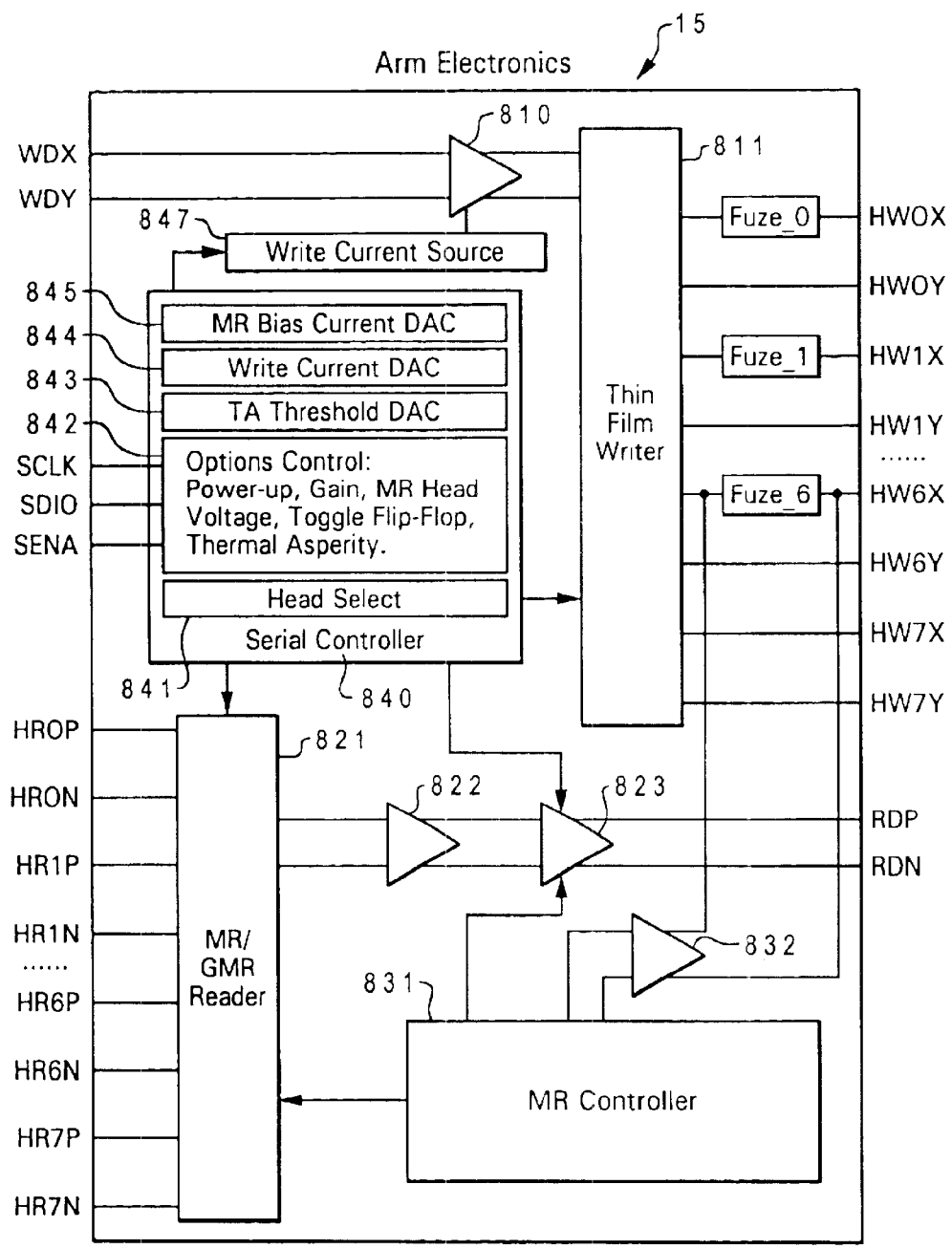
FIG. 8 shows PROM circuitry in the arm electronics of a hard disk drive.

With reference now to FIG. 8, there is shown PROM circuitry in the arm electronics 15 of hard disk drive 99, in accordance with a preferred embodiment of the present invention. Arm electronics 15 reside on arm 22 of the HDD, in order to be proximal to read/write transducer 25. Arm electronics 15 is a preferred location for the fuzes because HDD 99 would have to be disassembled and the disk, actuator, and transducers exposed, in order for someone to attempt to physically replace the arm electronics 15 on arm 22 to enable rewriting a surface. Such an operation is unlikely, as it would place the data on the disk severely at risk.

Arm electronics 15 include a plurality of fuzes (Fuze_0–Fuze_6) that can be selectively "blown" to disable the write process for that surface served by the respective write head. These fuzes are similar to the arrays of addressable fuzes used in Programmable Read Only Memory (PROM). Programming of a PROM is done by selectively blowing the fuze lengths which function as memory cells. To have a zero programmed in a memory cell, the metal trace shorting the cell must be blown (i.e. create an open circuit) by injection of a high current into the fuze via power amplifier 832, for example, which would blow Fuze_6. Because of the destructive and permanent nature of programming PROM devices, they can only be programmed once, but read many times. While in a preferred embodiment the fuzes (Fuze_0–Fuze_6) are located within the arm electronics 15, the fuzes can be located in other locations within the HDD such as within a memory chip or write channel chip.

The convolution-encoded write signal, WDX (Write Data +) and WDY (Write Data -), comes from the write channel portion of I/O channel 112, over cable 27, and passes through amplifier 810 to thin film (TF) writer 811. From thin film writer 811, the write signal goes out to a write head on a slider. Arm electronics 15 could support any number of disks, with each disk having one or preferably two surfaces. However, in FIG. 8, arm electronics 15 is depicted as supporting four disks in an HDD, which comprises eight surfaces. Each surface is supported by one independent transducer head with MR (magnetoresistive) or GMR (giant magnetoresistive) read elements and inductive write elements. HW0X (Head 0 Write +) and HW0Y (Head 0 Write -) are output to inductive write head 0 on slider 20 via cable 17 to support write operations on surface 0 of disk 0. HW1X and HW1Y are output to a slider on the obverse side of the disk, via cable 17 to support inductive write head 1 on surface 1 of disk 0, etc.

HR0P (Head 0 Read +) and HR0N (Head 0 Read -) are input from slider 20 via cable 17 to receive the read signal from MR/GMR read head 0 on surface of disk 0. HR1P and HR1N are input from a slider on the obverse side of the disk, via cable 17 to receive the read signal from read head 1 on surface 1 of disk 0, etc. This read signal passes through MR/GMR reader 821, amplified in amplifiers 822 and 823, before leaving arm electronics 15 via RDP (Read Data +) and RDN (Read Data -) over cable 27 to be PRML decoded by the read channel portion of I/O channel 112.

MR Controller 831 controls the MR/GMR reader 821, thin film writer 811, and current to a series of amplifiers 832, one of which is shown. Output of this amplifier 832 goes to one of a series of PROM "blowable" fuzes from Fuze_0 for TF write head 0 to Fuze_6 for TF write head 6. Once a surface is written, or the user desires to convert that surface to read-only, the fuze for that surface is selectively "blown" to prevent further writing to that particular surface. FIG. 8 shows that amplifier 832 would be used to blow Fuze_6. Once Fuze_6 is blown, the circuit to the MR/GMR read head 6 is "open," thus prohibiting further writing to surface 6 of disk 3. The other surfaces with intact fuzes would be RAM (random access memory), which is also known as rewritable, until the fuze associated with that surface is blown. The last surface, in this case surface 7, is left as RAM in order to contain the spare sectors for the other read-only surfaces.

In a preferred embodiment, arm electronics 15 and the LBA calculations of processor 100 would be designed to sequentially write each of the tracks across the surface of a disk from the outermost track to the innermost track, completely filling up a disk before moving to the next surface for writing data. Therefore, the fuzes are only blown once, either when an entire disk surface has been written or when the contents of a partially written surface need to be immediately made WORM. Additionally, arm electronics 15 has serial controller 840 which has a three-line serial interface SCLK, SDIO, and SENA. Serial controller 840 provides options control 842 and thermal asperity (TA) threshold digital-to-analog converter (DAC) 843, to overcome the electrical noise caused by TA spikes. A bias to the MR head can improve its performance, and this is provided by MR bias current DAC 845. The selection of read/write head is made by head select 841.

Figure 9:
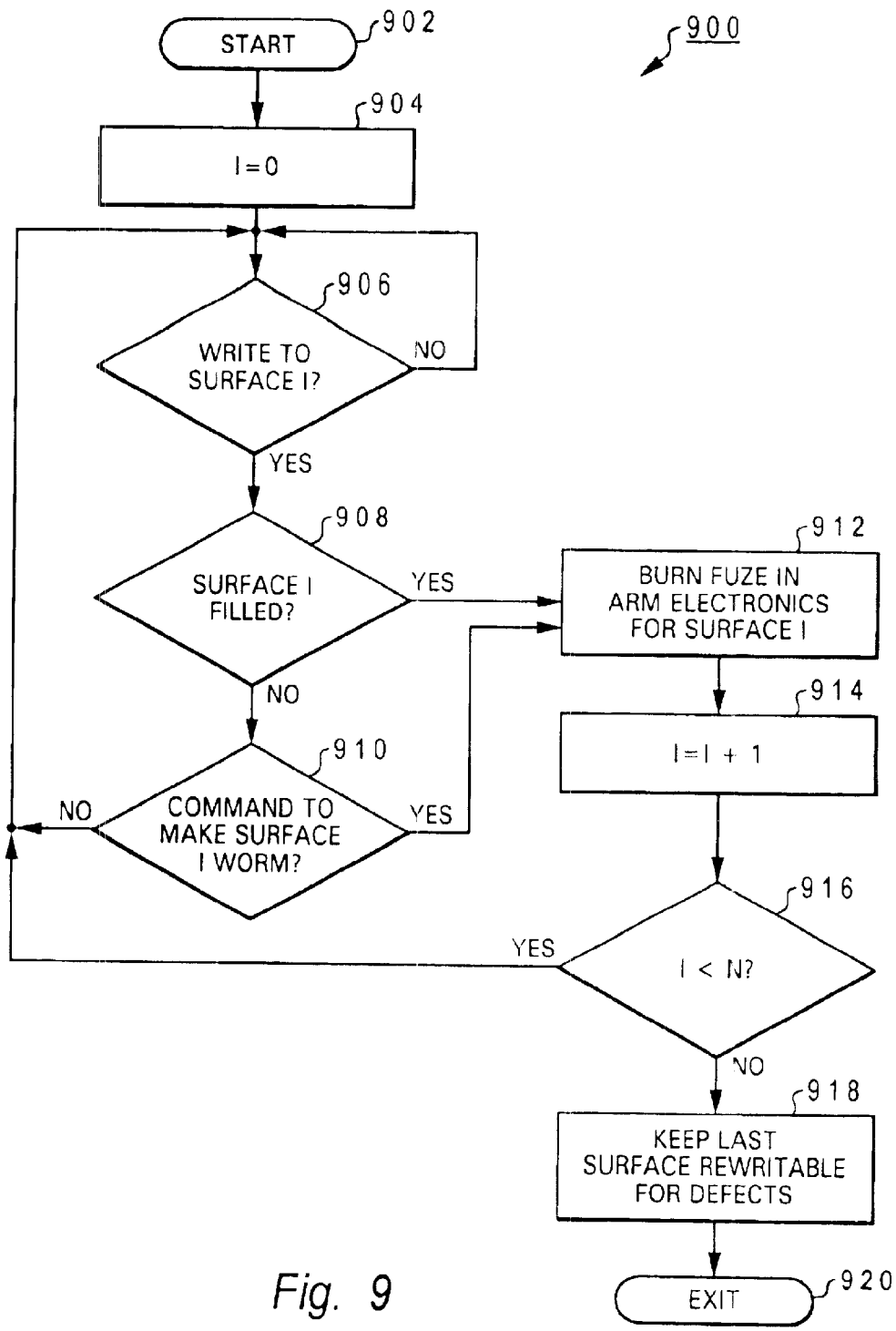
FIG. 9 is a flowchart regarding the use of PROM circuitry in the arm electronics of a hard disk drive.

FIG. 9 shows a flowchart of process 900 for the use of the arm electronics 15 shown in FIG. 8. The process begins at step 902 and flows to step 904, where the surface index (I) is set to zero, meaning that we are on the first recording surface. The process flows to decision step 906, where the determination is made whether writing occurs to surface I. If not the process loops back to step 906. If writing did occur in decision step 906, the process flows to decision step 908 to determine whether surface I is filled. If yes, then the process flows to step 912, where the fuze in the arm electronics PROM of FIG. 8 will be burned into an "open state" for that surface, thus disabling all further writing to that surface. Alternately, the user could invoke decision step 910, where a check is made whether to make surface I a WORM. Step 910 could be invoked by the user before surface I is filled. If a command to make surface I as WORM is invoked, the process flows to step 912. If not, the process flows back to step 906 for further possible writing.

From step 912, the process flows to step 914, where surface index I is incremented by one because further writing to the previous surface is now prohibited by step 912. In step 916, a check is made whether I is less than the total number of surfaces (N) in the disk drive. If not, the process flows back to step 906 for further possible writing. However, if I is equal to the total number of surfaces (N), the process flows to step 918, where further PROM fuze blowing is prevented. Step 918 allows for defective sectors in the WORM surfaces to be relocated, in case of sector defects occurring as the disk recording surfaces age. Thereafter the process ends at step 920.

Figure 10:
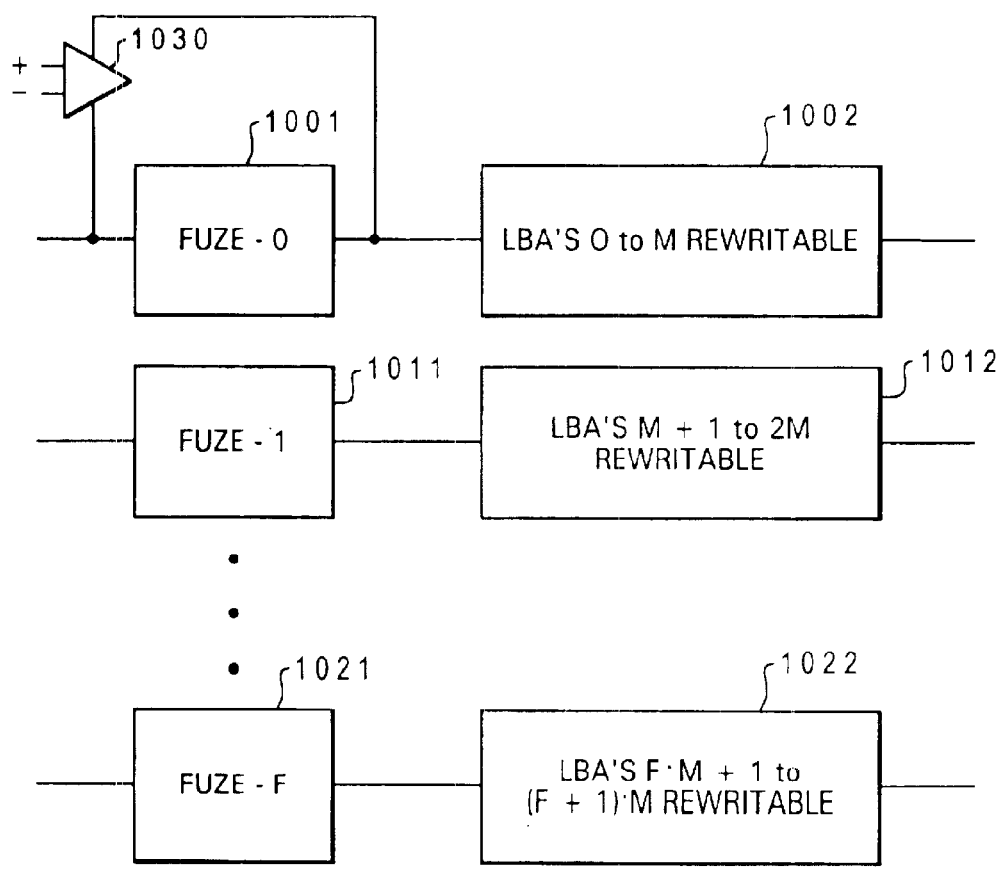
FIG. 10 shows PROM circuitry in the memory of a hard disk drive.

FIG. 10 shows an alternative embodiment of the fuzes (Fuze_0–Fuze_F) configured within memory 102 of FIG. 3, and the process of blowing the fuzes being done by processor 100 related to LBA addresses, rather than the disk surfaces. As previously mentioned, processor 100 of FIG. 3 refers to information stored in memory 102 during LBA calculations. When fuze 1001 is blown, writing is prohibited to LBA addresses 0 to M. LBA addresses 0 to M is called one LBA segment, in FIG. 11. When fuze 1011 is blown, writing is prohibited to LBA addresses M+1 to 2M, which comprises the second LBA segment. When fuze 1021 is blown, writing is prohibited to LBA addresses $F_{\alpha}M+1$ to $(F+1)_{\alpha}M$. Thus, as seen from FIG. 10, sections of each disk surface may be converted to WORM without converting the entire disk surface to WORM. Current source 1030, for example, would be used to blow fuze 1001 in FIG. 10, changing the access to LBAs 0–M from rewritable to WORM. For this alternate embodiment, it is preferred that memory 102 resides within disk drive 99, so that it cannot be physically replaced without risking destruction of the customer data.

Figure 11:
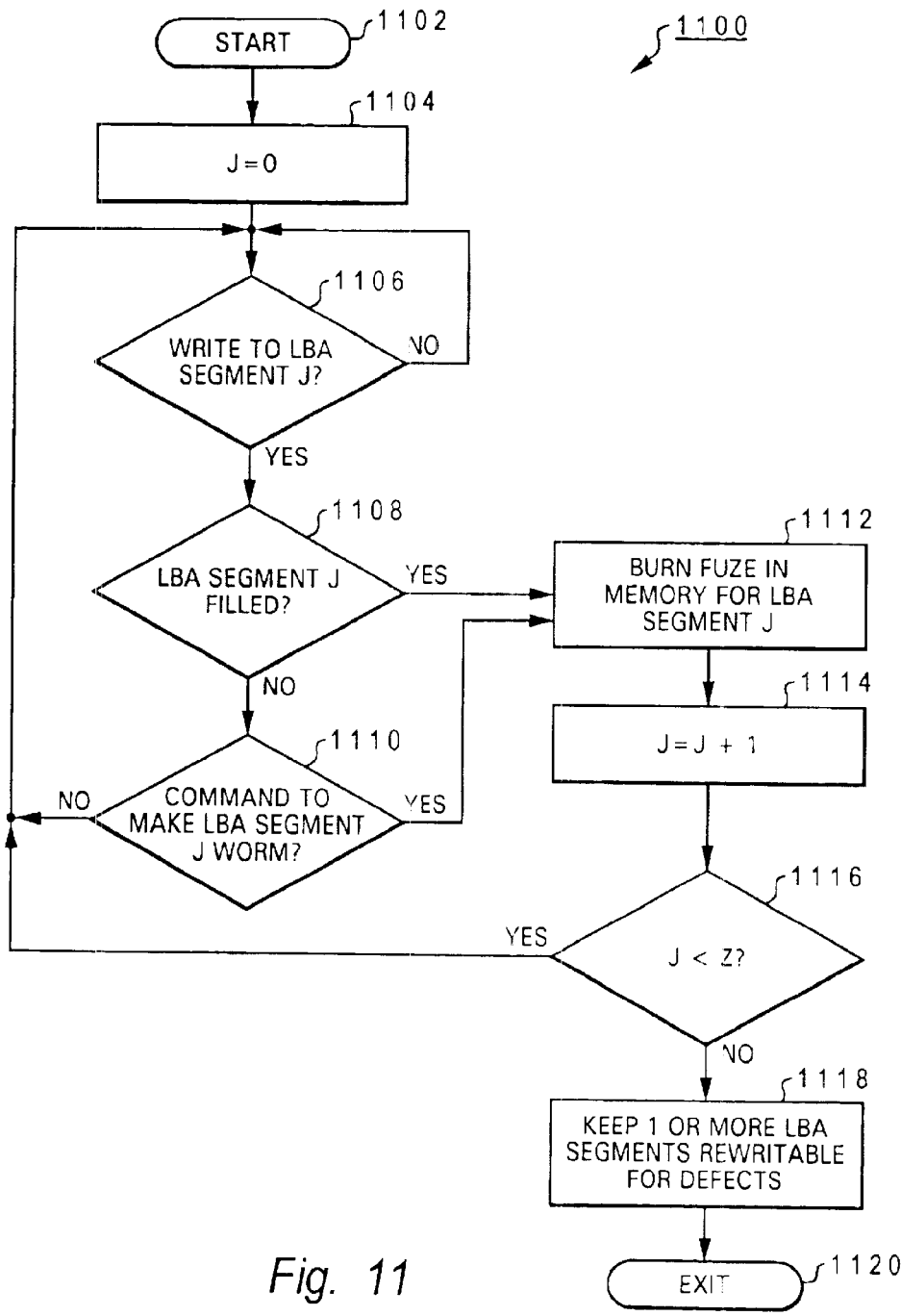
FIG. 11 is a flowchart regarding the use of PROM circuitry in the memory of a hard disk drive.

FIG. 11 shows a flowchart of process 1100 for the use of the circuitry shown in FIG. 10. The process begins at step 1102 and flows to step 1104, where LBA segment index (J) is set to zero (i.e. set to the first LBA segment). The process flows to decision step 1106, where the determination is made whether writing occurs to LBA segment J. If not, the process loops back to step 1106. If writing did occur in decision step 1106, the process flows to decision step 1108, where it is determined whether LBA segment J is filled. If yes, then the process will flow to step 1112 where the associated fuze in the arm electronic PROM (as seen in FIG. 10) will be burned into an "open state" for that LBA segment, thus disabling all further writing to that LBA segment. Alternately, the user could invoke decision step 1110, where a check is made whether to make LBA segment J into a WORM. Step 1110 could be invoked before LBA segment J is filled. If step 1110 is invoked, the process flows to step 1112. If step 1110 is not invoked, the process flows back to step 1106 for further possible writing.

From step 1112, the process flows to step 1114, where LBA index J is incremented by one because further writing to the previous LBA segment is now prohibited by step 1112. In step 1116, a check is made whether J is less than the total number of LBA segments (Z). If not, the process flows back to step 1106 for further possible writing. If J is equal to the number of LBA segments Z, the process flows to step 1118, where further PROM fuze blowing is prevented. Step 1118 allows for defective sectors in the WORM surfaces to be relocated, in case of sector defects occurring as the disk recording surfaces age.

While the preferred embodiments of the present invention have been illustrated in detail, it should be apparent that modifications and improvements may be made to the invention without departing from the spirit and scope of the invention. This includes the disk drive being a near field recording disk drive employing magneto-optical media. This also includes burning PROM fuzes in the Memory-in-Cassette (MIC) of tape cartridges to convert the tape from rewritable to WORM, where the PROM memory resides in the body of the tape cartridge and is accessed by a processor in a tape drive.

What is claimed is:

1. A method for implementing a write-once read-many functionality for storage of data on a rotating disk drive data storage device containing at least one rotatably mounted disk for recording data on at least one surface of said at least one rotatably mounted disk and a movable actuator supporting at least one transducer head, said actuator positioning said at least one transducer head to access data on said at least one surface of said at least one rotatably mounted disk, comprising the steps of:

a. determining that data has been written to a portion of said rotating disk drive data storage device; and
   b. responsive to said determination, blowing one or more fuzes electrically coupling a write signal to said transducer head, wherein said write signal is required at said transducer head to enable said transducer head to write data to said portion, and wherein blowing said one or more fuzes prevents said write signal from being received at said transducer head, thereby preventing said rotating magnetic disk drive data storage device from overwriting said data written to said portion.

2. The method of claim 1, wherein said portion is an entire recording surface of said at least one rotatably mounted disk.

3. The method of claim 1, wherein said portion is a sector of a recording surface of said at least one rotatably mounted disk.

4. The method of claim 1, wherein said one or more fuzes electrically couple circuitry for generating said write signal to said transducer head.

5. The method of claim 1, wherein said one or more fuzes electrically enable circuitry for generating said write signal associated with a specified logical address, wherein said portion is associated with said specified logical address such that said write signal associated with said specified logical address is required at said transducer head to enable said transducer head to write data to said portion.

6. The method of claim 1, further wherein said blowing step is performed by said rotating disk drive storage device responsive to an external command received by said rotating disk drive storage device.

7. A rotating disk drive data storage device, comprising:

a. a disk drive base;
   b. at least one rotatably mounted disk for recording data on at least one surface of said at least one rotatably mounted disk;
   c. a movable actuator supporting at least one transducer head, said actuator positioning said at least one transducer head to access data on said at least one surface of said at least one rotatably mounted disk; and
   d. circuitry for controlling the operation of said disk drive data storage device, said circuitry producing at least one write signal that instructs said at least one transducer head to write data to at least one portion of at least one surface of at least one rotatably mounted disk of said at least one rotatably mounted disk, said circuitry further including one or more fuzes electrically coupling said at least one transducer head to said at least one write signal, wherein blowing said one or more fuzes prevents said at least one write signal from being received at said transducer head, thereby preventing said rotating magnetic disk drive data storage device from overwriting said data written to said at least one portion.

8. The rotating disk drive data storage device of claim 7, wherein said at least one portion is an entire recording surface of said at least one rotatably mounted disk.

9. The rotating disk drive data storage device of claim 7, wherein said at least one portion is a sector of a recording surface of said at least one rotatably mounted disk.

10. The rotating disk drive data storage device of claim 7, wherein said one or more fuzes electrically couple circuitry for generating said at least one write signal to said transducer head.

11. The rotating disk drive data storage device of claim 7, wherein said one or more fuzes electrically enable circuitry for generating at least one write signal associated with a specified logical address, wherein said at least one portion is associated with said specified logical address such that said at least one write signal associated with said specified logical address is required at said at least one transducer head to enable said at least one transducer head to write data to said at least one portion.

12. The rotating disk drive data storage device of claim 7, wherein said circuitry produces said at least one write signal responsive to an external command received by said rotating disk drive storage device.

13. The rotating disk drive data storage device of claim 7, wherein said rotating disk drive data storage device is one of a plurality of rotating disk drive data storage devices.

14. The rotating disk drive data storage device of claim 7, wherein said rotating disk drive data storage device is a magnetic rotating disk drive data storage device.

15. An article of manufacture comprising signal-bearing storage media including program logic embedded therein that causes control circuitry of a rotating disk drive data storage device to perform the steps of:
   a. determining that data has been written to a portion of at least one rotatably mounted disk of said rotating disk drive data storage device, wherein said at least one rotatably mounted disk is capable of recording data on at least one surface of said at least one rotatably mounted disk and wherein said rotating disk drive data storage device includes at least one transducer head to access data on said at least one surface of said at least one rotatably mounted disk; and
   b. responsive to said determination, blowing one or more fuzes electrically coupling a write signal to said transducer head, wherein said write signal is required at said transducer head to enable said transducer head to write data to said portion, and wherein blowing said one or more fuzes prevents said write signal from being received at said transducer head, thereby preventing said rotating magnetic disk drive data storage device from overwriting said data written to said portion.

16. The article of manufacture of claim 15, wherein said portion is an entire recording surface of said at least one rotatably mounted disk.

17. The article of manufacture of claim 15, wherein said portion is a sector of a recording surface of said at least one rotatably mounted disk.

18. The article of manufacture of claim 15, wherein said one or more fuzes electrically couple circuitry for generating said write signal to said transducer head.

19. The article of manufacture of claim 15, wherein said one or more fuzes electrically enable circuitry for generating said write signal associated with a specified logical address, wherein said portion is associated with said specified logical address such that said write signal associated with said specified logical address is required at said transducer head to enable said transducer head to write data to said portion.

20. The article of manufacture of claim 15, further wherein said blowing step is performed by said rotating disk drive storage device responsive to an external command received by said rotating disk drive storage device.

* * * * *